(12) United States Patent
Saeki

(10) Patent No.: US 10,689,040 B2
(45) Date of Patent: Jun. 23, 2020

(54) VEHICLE UNDERBODY

(71) Applicant: TOYOTA JIDOSHA KABUSHIKI KAISHA, Toyota-shi, Aichi-ken (JP)

(72) Inventor: Koji Saeki, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 3 days.

(21) Appl. No.: 16/048,733

(22) Filed: Jul. 30, 2018

(65) Prior Publication Data

US 2019/0039660 A1 Feb. 7, 2019

(30) Foreign Application Priority Data

Aug. 7, 2017 (JP) .................................. 2017-152683

(51) Int. Cl.
*B62D 25/20* (2006.01)

(52) U.S. Cl.
CPC .......... *B62D 25/20* (2013.01); *B62D 25/2018* (2013.01); *B62D 25/2027* (2013.01)

(58) Field of Classification Search
CPC ................ B62D 25/20; B62D 25/2027; B62D 25/2036; B62D 25/2009; B62D 25/2018; B62D 21/02; B62D 25/087
USPC ...... 296/193.07, 187.8, 204, 193.08, 29, 75, 296/191, 198; 29/897.2, 458, 525.08, 29/525.02, 525.11; 428/99, 116, 158, 428/172, 192, 85, 61, 457, 209
See application file for complete search history.

(56) References Cited

U.S. PATENT DOCUMENTS

| 4,557,519 | A | * | 12/1985 | Matsuura | ........... | B62D 25/2027 |
| | | | | | | 296/187.11 |
| 4,804,222 | A | * | 2/1989 | Sakiyama | ............ | B62D 25/082 |
| | | | | | | 296/203.02 |
| 8,287,032 | B2 | * | 10/2012 | Mori | .................. | B62D 25/2036 |
| | | | | | | 296/187.03 |
| 8,991,905 | B2 | * | 3/2015 | Mochizuki | ......... | B62D 25/2027 |
| | | | | | | 296/193.07 |
| 9,884,657 | B2 | * | 2/2018 | Saeki | ..................... | B62D 21/03 |
| 2014/0232141 | A1 | * | 8/2014 | Mochizuki | ............. | B62D 25/20 |
| | | | | | | 296/193.07 |

FOREIGN PATENT DOCUMENTS

JP H02-56787 U 4/1990

* cited by examiner

*Primary Examiner* — D Glenn Dayoan
*Assistant Examiner* — Sunsurraye Westbrook
(74) *Attorney, Agent, or Firm* — Oliff PLC

(57) ABSTRACT

A vehicle underbody provides a simple structure which enhances the strength and rigidity at a joint between a tunnel portion and a cross member. The tunnel portion of a floor member extends rearward from the front of the vehicle to reach the cross member. The cross member includes a shelf board portion on a side towards the front. The shelf board portion is longer than the tunnel portion along the transverse axis of the vehicle. The rear end portion of the top surface of the tunnel portion is overlapped with the shelf board portion such that the top surface of the tunnel portion and the shelf board portion are connected there by spot welding or the like.

4 Claims, 2 Drawing Sheets

VEHICLE UNDERBODY

CROSS REFERENCE TO RELATED APPLICATION

The disclosure of Japanese Patent Application No. 2017-152683 filed on Aug. 7, 2017 including the specification, claims, drawings, and abstract is incorporated herein by reference in its entirety.

TECHNICAL FIELD

The present disclosure related to a vehicle underbody.

BACKGROUND

A vehicle underbody includes a floor member forming a floor portion of a vehicle, a pair of side frames respectively extending along side edges of the floor member along a longitudinal axis of the vehicle, and a cross member extending along a transverse axis of the vehicle to connect the pair of the side frames. At a center portion along the transverse axis of the vehicle, the floor member includes a ridge-shaped tunnel portion which protrudes upwards and extends along the longitudinal axis of the vehicle. The tunnel portion extends from a front portion to the cross member.

JP H02-56787U discloses a structure in which a tunnel portion (a backbone 1a) of a floor member (a vehicle floorpan 1) and a cross member (a rear sheet cross member 5A) is connected with a reinforcing member (a reinforcing member 5a). It should be noted that the members and reference numerals in parentheses refer to those in JP H02-56787U and do not relate to those used in the embodiments of the present disclosure.

SUMMARY

Technical Problem

The strength and the rigidity around a joint between a tunnel portion of a floor member and a cross member significantly affects the strength and the rigidity of a vehicle body. When using the structure disclosed in JP H02-56787U, a reinforcing member is required to disperse, to the cross member, load acting along the longitudinal axis of the vehicle transmitted through the tunnel portion, thereby increasing the number of required components. An object of the present disclosure is to enhance the strength and the rigidity at the joint between the tunnel portion of the floor member and the cross member by means of a simple structure.

Solution to Problem

An underbody according to one embodiment of the present disclosure includes a cross member extending along a transverse axis of a vehicle and connecting a pair of right and left side frames extending along a longitudinal axis of the vehicle. The underbody also includes a tunnel portion which protrudes upward at a transverse center portion of a floor member which forms a floor portion of a vehicle compartment. The tunnel portion extends rearward from a front of the vehicle to reach the cross member. The cross member includes a shelf board portion on a side towards the front of the vehicle. The shelf board portion is longer than the tunnel portion along the transverse axis of the vehicle. A rear end portion of a top surface of the tunnel portion is overlapped with and connected to the shelf board portion.

The cross member may have a closed cross section structure in which an upper member and a lower member are connected. The upper member and the lower member may be overlapped with and connected to each other at the shelf board portion.

The top surface of the tunnel portion may also be overlapped where the upper member and the lower member of the cross member are overlapped such that the top surface of the tunnel portion, the upper member, and the lower member are connected.

The height of a joint position between the top surface of the tunnel portion and the shelf board portion may be equal to the height of the centroid of a closed cross section of the cross member in a cross section perpendicular to the transverse axis of the vehicle.

Advantageous Effects of Invention

The strength of vehicle body can be improved by dispersing force acting along the longitudinal axis from the tunnel portion to avoid local concentration of the force on the cross member. The flexural rigidity of vehicle body can also be improved because the top surface of the tunnel portion and the shelf board portion of the cross member which are connected together can function as a structural member which resists bending of the vehicle body in a horizontal plane.

BRIEF DESCRIPTION OF DRAWINGS

Embodiment(s) of the present disclosure will be described based on the following figures, wherein.

DESCRIPTION OF EMBODIMENTS

Figure 1:
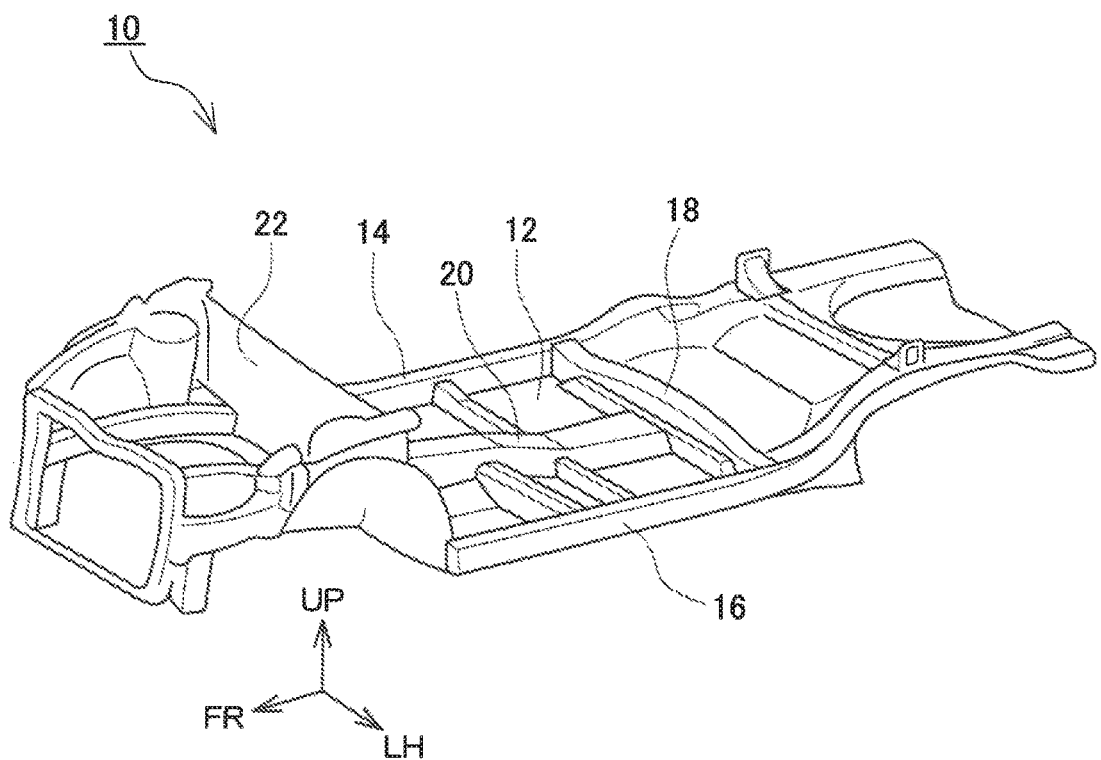
FIG. 1 is a diagram showing an entire underbody of a vehicle according to one embodiment of the present disclosure.

Embodiments of the present disclosure are described below with reference to the attached drawings. FIG. 1 is a diagram showing an underbody 10 of a vehicle according to one embodiment of the present disclosure. Arrow FR in FIG. 1 indicates the front of the vehicle, Arrow LH indicates the left, and Arrow UP indicates the up side. In the description below, unless otherwise indicated, positions such as "front," "rear," "right," and "left" indicate the positions relative to the vehicle.

The underbody 10 includes a floor member 12 forming a floor portion of a passenger compartment, a pair of side members 14, 16, each extending along the right or left edge of the floor member 12 along a longitudinal axis, and a cross member 18 extending along a transverse (right and left) axis of the vehicle. The cross member 18 extends to the side members 14, 16 to connect therebetween. The position of the cross member 18 along the longitudinal axis is below a front edge of rear seats. The floor member 12 is formed of a metal plate and includes a tunnel portion 20 which protrudes upwards at the center along the transverse axis and extends like a ridge along the longitudinal axis. The tunnel portion 20 extends rearward from a bulkhead 22 which forms a partition between the passenger compartment and an engine compartment. The tunnel portion 20 reaches the cross member 18.

Figure 2:
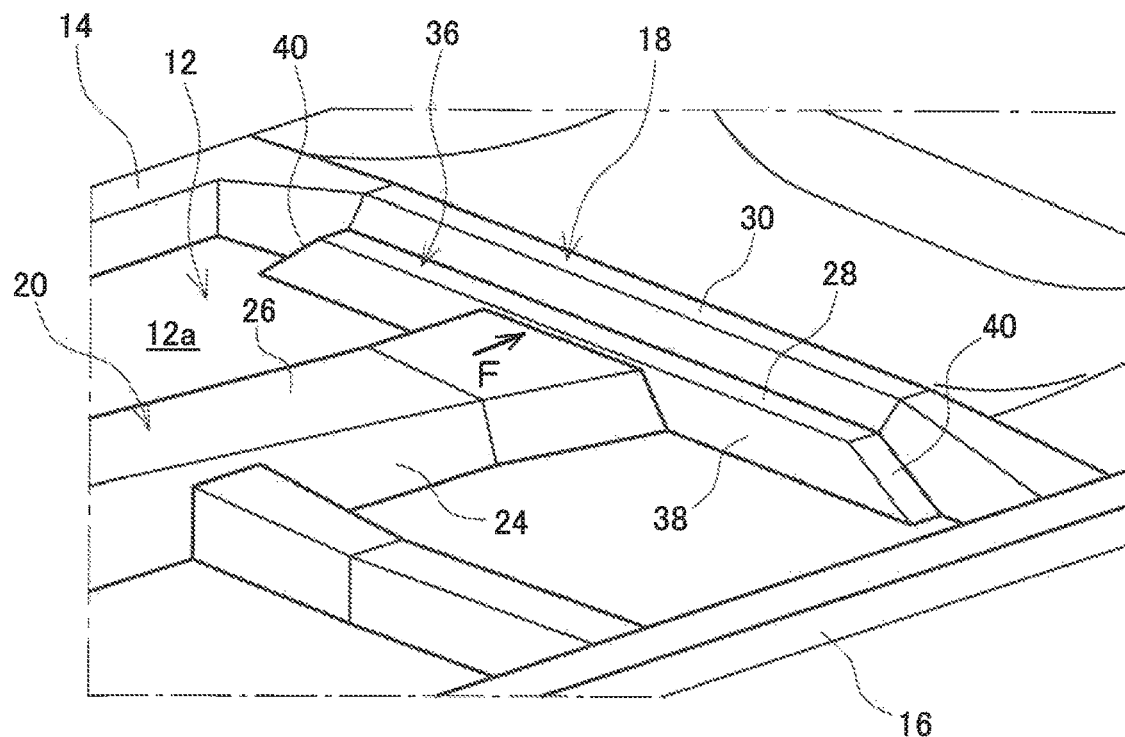
FIG. 2 is an enlarged diagram showing a joint between a tunnel portion and a cross member.
Figure 3:
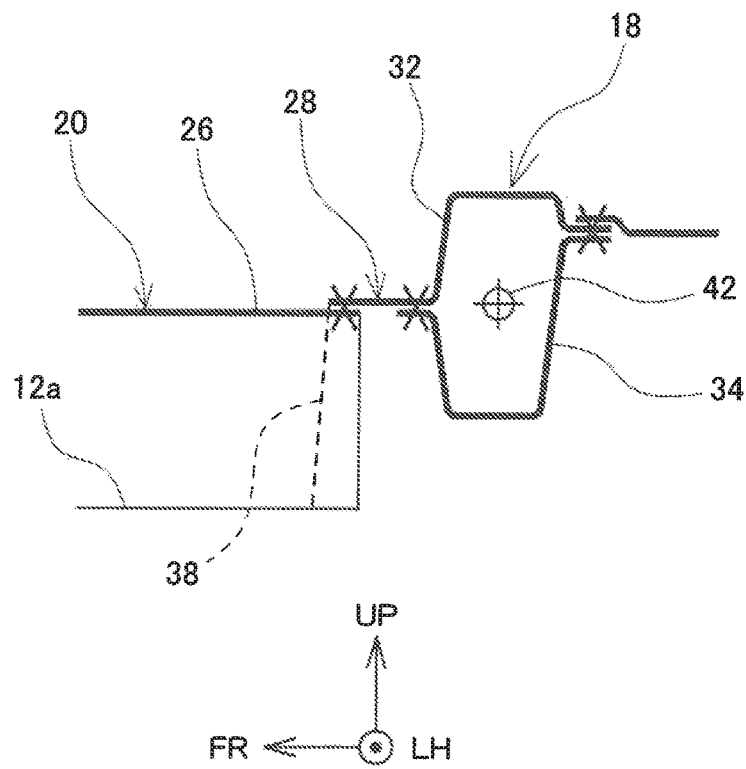
FIG. 3 is a median plane cross-sectional diagram of a joint between a tunnel portion and a cross member according to one embodiment of the present disclosure.

FIG. 2 is an enlarged view around the cross member 18. FIG. 3 is a cross-sectional view of the cross member 18 and the tunnel portion 20 taken along the line perpendicular to the transverse axis. The tunnel portion 20 is a protruded portion having a substantially trapezoidal cross section. The tunnel portion 20 is part of a frame of the underbody 10. A component which extends along an axis connecting a front portion and a rear portion of the vehicle, such as an exhaust pipe or a propeller shaft for a rear-wheel drive vehicle, runs inside the tunnel portion 20. The tunnel portion 20 includes side walls 24 on the right and left, and a top surface 26 disposed between the upper edges of the side walls 24.

The cross member 18 includes a shelf board portion 28 which extends forward. The shelf board portion 28 is disposed lower than a top surface 30 of the cross member 18 and directly above the top surface 26 of the tunnel portion 20. Along the right and left axis (transverse axis of the vehicle), the shelf board portion 28 is longer than the top surface 26 of the tunnel portion 20.

As shown in FIG. 3, the cross member 18 is formed in a closed cross section from an upper member 32 (a metal plate) and a lower member 34 (a metal plate) which are connected together. The upper member 32 and the lower member 34 include a portion which extends forward from the cross member 18. The upper member 32 and the lower member 34 are connected together by being spot welded at the extended portions. In FIG. 3, Mark "X" indicates a spot welding position. The forwardly extended portions of the upper member 32 and the lower member 34 form the above-described shelf board portion 28. At portions not overlapped by the tunnel portion 20, the upper member 32 extends forward and then downward again to reach a bottom surface 12a of the floor member 12 where the upper member 32 is spot welded with the bottom surface 12a. In this way, as shown in FIG. 2, the upper member 32 has a step-like shape. A tread of a lower step 36 in the step structure forms the shelf board portion 28. A rise of the lower step 36 is referred to below as a lower step front wall 38. At positions nearer to the side members 14, 16, the closed cross surface of the cross member 18 becomes larger along a vertical axis such that joint surfaces of the upper member 32 and the lower member 34 form a downwardly inclined plane 40 continuously from the shelf board portion 28 towards each side. The inclined plane 40 reaches the bottom surface 12a of the floor member.

On the rear, each of the upper member 32 and the lower member 34 also includes a portion extending rearwards. The upper member 32 and the lower member 34 are spot welded at the extended portions.

The lower step front wall 38 is cut out along a rear end of the tunnel portion 20 such that the rear end of the tunnel portion 20 is inserted into the step-shaped lower step 36 through the cutout. In this way, the shelf board portion 28 and the rear end portion of the top surface 26 of the tunnel portion 20 are overlapped such that the shelf board portion 28 and the top surface 26 are connected together by being spot welded at the overlapped portion.

When a force F acts towards the cross member 18 from the tunnel portion 20, the force F is transmitted to the cross member 18 via the shelf board portion 28. Because the shelf board portion 28 is longer than the top surface 26 of the tunnel portion 20 along the transverse axis, the force acting on the cross member 18 can be dispersed. In this way, a locally concentrated distortion of the cross member 18 can be reduced and the load acting on the tunnel portion 20 can be more efficiently received by the cross member 18.

The shelf board portion 28 of the cross member 18 and the top surface 26 of the tunnel portion 20 form a T-shaped structure disposed in a single horizontal plane. This structure can contribute to maintain an angular relationship between the cross member 18 and the tunnel portion 20 to resist bending of the vehicle in the horizontal plane. In this way, the flexural rigidity can be improved.

As shown in FIG. 3, the shelf board portion 28 is positioned at the same height as the centroid 42 of the closed cross section of the cross member 18. In this way, in the cross section perpendicular to the right and left axis, the force F from the top surface 26 of the tunnel portion 20 can be suppressed from causing a moment to rotate the cross member 18. Because the rotation of the cross member 18 can be suppressed, the force F from the top surface 26 can be sufficiently received by the cross member 18.

Figure 4:
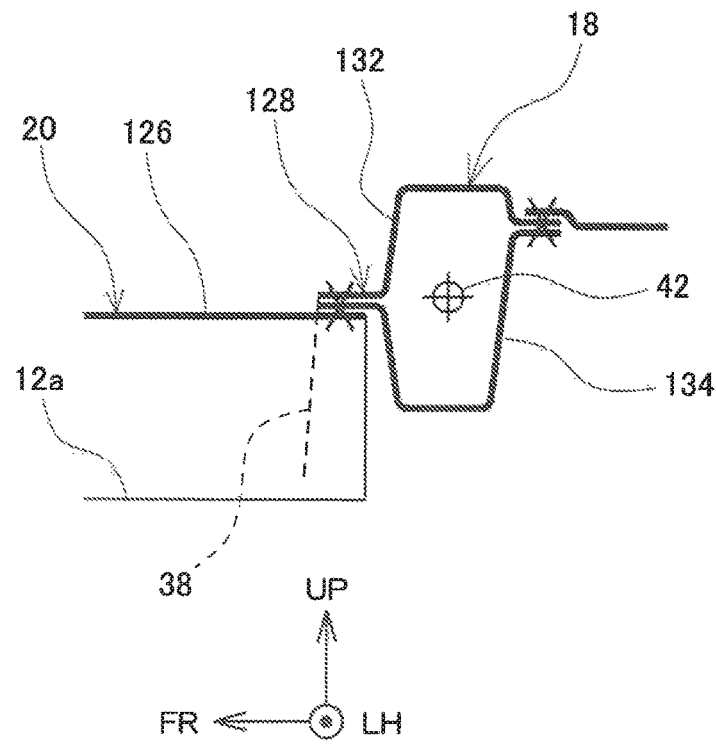
FIG. 4 is a median plane cross-sectional diagram of a joint between a tunnel portion and a cross member according to another embodiment of the present disclosure.

FIG. 4 shows another embodiment of the joint structure between the cross member 18 and the tunnel portion 20. The same reference numerals are assigned to the above-mentioned elements and the description of these elements is omitted. An upper member 132 and a lower member 134 respectively include portions extending forward. These extending portions are overlapped each other to form a shelf board portion 128. A rear end of a top surface 126 of the tunnel portion 20 is also overlapped with the upper member 132 and the lower member 134 such that these three are welded. In this way, the rigidity of the joint between the shelf board portion 128 and the top surface 126 of the tunnel portion 20 can be further enhanced.

REFERENCE NUMERALS 10 underbody, 12 floor member, 12a bottom surface of floor member, 14, 16 side member, 18 cross member, 20 tunnel portion, 22 bulkhead, 24 side walls (of tunnel portion), 26, 126 top surface (of tunnel portion), 28, 128 shelf board portion (of cross member), 30 top surface (of cross member), 32, 132 upper member, 34, 134 lower member, 36 (step-shaped) lower step, 38 lower step front wall, 40 inclined plane, and 42 centroid of the closed cross section of the cross member.

The invention claimed is:

1. A vehicle underbody comprising:
   a cross member extending along a transverse axis of a vehicle and connecting a pair of right and left side frames extending along a longitudinal axis of the vehicle;
   a tunnel portion protruding upward at a transverse center portion of a floor member which forms a floor portion of a vehicle compartment, the tunnel portion extending rearward from a front of the vehicle to reach the cross member;
   a shelf board portion on a side towards the front of the vehicle of the cross member, the shelf board portion protruding toward the front of the vehicle, the shelf board portion being longer than the tunnel portion along the transverse axis of the vehicle; and
   a rear end portion of a top surface of the tunnel portion that is overlapped with and connected to the shelf board portion.

2. The vehicle underbody according to claim 1, wherein the cross member has a closed cross section structure in which an upper member and a lower member are connected such that the upper member and the lower member are overlapped with and connected to each other at the shelf board portion.

3. The vehicle underbody according to claim 2, wherein the top surface of the tunnel portion is also overlapped where the upper member and the lower member of the cross member are overlapped such that the top surface of the tunnel portion, the upper member, and the lower member are connected.

4. The vehicle underbody according to claim 1, wherein a height of a joint position between the top surface of the tunnel portion and the shelf board portion is equal to the height of the centroid of a closed cross section of the cross member in a cross section perpendicular to the transverse axis of the vehicle.

* * * * *